Sept. 21, 1937.  J. L. HATCHER  2,093,441
SYNCHRONIZED CONTROL GEAR FOR MACHINE GUNS
Filed Aug. 21, 1936
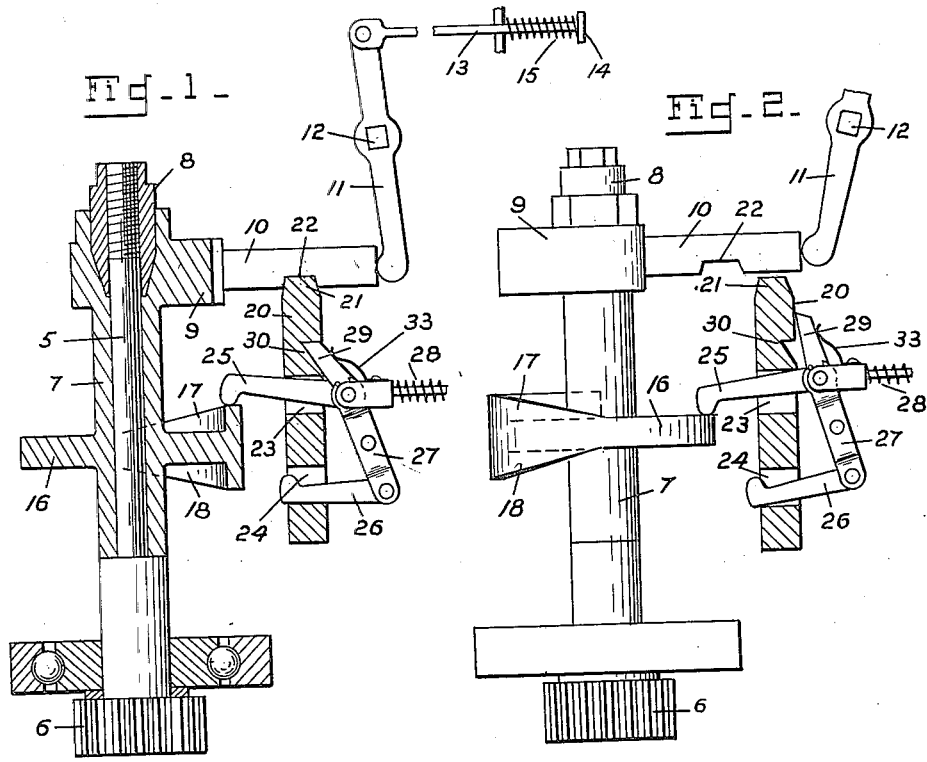
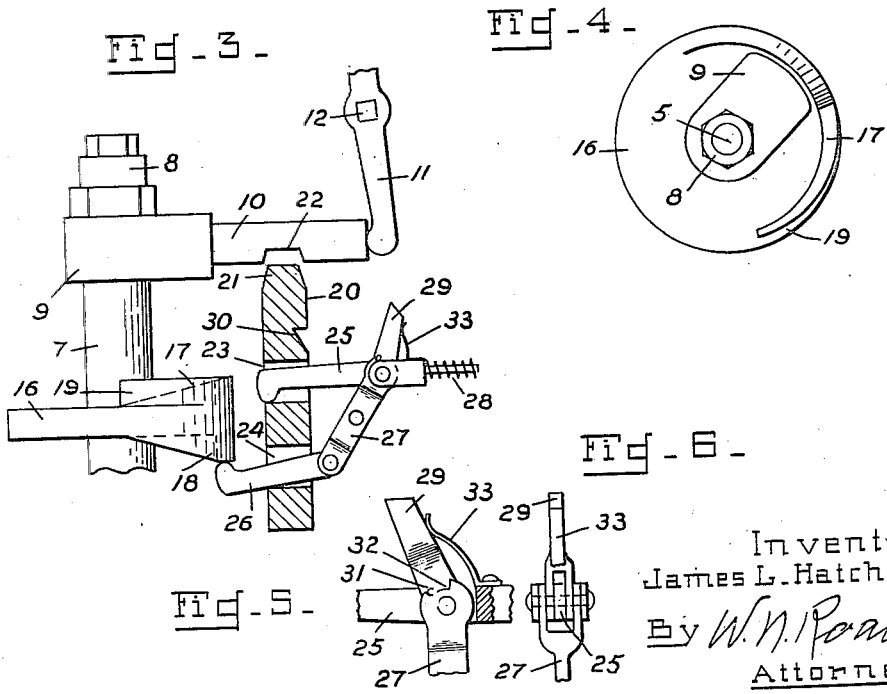
Inventor
James L. Hatcher
By W. N. Roach
Attorney

UNITED STATES PATENT OFFICE 2,093,441

SYNCHRONIZED CONTROL GEAR FOR MACHINE GUNS

James L. Hatcher, United States Army, Winchester, Va.

Application August 21, 1936, Serial No. 97,135

4 Claims. (Cl. 89—27)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a synchronized control gear for machine guns.

In arranging a machine gun to fire between the propeller blades of aircraft it is customary to control the operation of a trigger motor on the gun by means of an impulse generator associated with the engine that drives the propeller. An impulse transmission member in the form of a cam follower is normally held in inoperative position by a control plunger which is withdrawn when the cam follower is to function in firing the gun.

The purpose of this invention is to provide a positive mechanism for moving the control plunger into and out of locking engagement with the cam follower.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a more or less diagrammatic view partly in side elevation and partly in section showing the control gear at the instant when the plunger is completely seated in the recess of the cam follower;

Fig. 2 is a similar view showing the position of the parts preparatory to moving the plunger into engagement with the cam follower;

Fig. 3 is a view showing the plunger held out of engagement with the cam follower.

Fig. 4 is a plan view of the cam shaft.

Figs. 5 and 6 are detail views in side and end elevation of the latch.

Referring to the drawing by characters of reference there is shown the impulse generator of a gun control assembly including a shaft 5 having a gear 6 on its lower end whereby it is driven from the aircraft engine. A sleeve 7 mounted on a reduced part of the shaft 6 is connected thereto in any suitable manner, specifically by means of a split wedge nut 8 threaded on the other end of the shaft.

An impulse cam member 9 is fixed on the upper end of the sleeve, being integral therewith or formed separately therefrom when necessary for the purpose of assembly. The cam member is about 55 degrees in width and is arranged to actuate a cam follower 10 which is perpendicular to the shaft 5. The cam follower is normally held in engagement with the cam member by a lever 11 which is squared on a shaft 12 and which is secured to an impulse cable 13 leading to the trigger motor which is only diagrammatically shown and indicated at 14. A spring 15 acting on the cable 13 causes the lever 11 to exert a pressure of about 100 pounds on the cam follower.

A plate 16 fixed on the sleeve 7 parallel to the cam member 9 is provided on its opposite sides with an upper control cam 17 and a lower control cam 18. The control cams occupy the same relative position on the plate and extend along the margin thereof for about 180 degrees. The peak of the upper cam 17 follows that of the impulse cam 9 when the shaft 5 is rotating in the proper direction and the purpose of this arrangement will presently appear while the peak of the lower cam 18 is coextensive with the peak of the impulse cam 9. The trailing end of the upper cam 17 gradually recedes from the periphery of the plate 16 so that its outer side forms a cam surface 19 which will hereafter be referred to as the safety cam.

A reciprocally mounted plunger 20 arranged parallel to the shaft 5 and extending past the plate 16 has a tapered upper end 21 adapted to enter a recess 22 in the cam follower 10 for the purpose of holding the follower out of the path of movement of the cam member 9. The plunger is provided with a pair of apertures 23 and 24 for respectively receiving an upper arm 25 and a lower arm 26, the arms being pivotally mounted on the ends of a centrally pivoted lever 27.

Upon movement of the lever 27 the arms 25 and 26 are displaced so that their free ends are selectively positioned in the path of movement of the control cams 17 and 18. A spring 28 acts on the upper part of the lever 27 to normally maintain the upper arm 25 in engagement with the upper control cam 17. The lower arm 26 engages the lower control cam 18 only when forced into that position by the gun operator when the latter is acting on a trigger, the actuating force being applied or transmitted either mechanically or electrically as is well understood in the art.

The upper end of the lever 27 carries a finger 29 adapted to enter a notch 30 in the plunger 20 when the plunger is in engagement with the cam follower as shown in Fig. 1. The movement of finger is limited by means of a stop pin 31 riding in a slot 32 in the lever (Fig. 5) and is normally moved towards the notch by a spring 33.

The parts are normally in the position shown in Fig. 1, the plunger 20 being engaged in the recess 22 of the cam follower 10 so that the gun cannot be fired and the impulse cam member 9 rotates with the shaft 5 without acting on the cam follower. The pressure of the spring 15 tending to move the cam follower is sufficiently great to prevent removal of the plunger 20 from the recess 22. However as an additional safeguard the finger 29 is engaged in the notch 30 of the plunger to prevent its withdrawal.

When the gun is to be fired the operator moves the lever 27 to place the free end of the lower arm 26 in the path of the lower control cam 18. The cam 18 rocks the arm about its pivot and the arm acts on the plunger through the lower surface of the aperture 24 to withdraw the plunger from the recess 22 and thereby free the cam follower 10. The cam follower when free is immediately moved by the spring 15 into engagement with the cam member 9 which is being rotated by the shaft 5. When the high point of the cam member 9 arrives opposite the cam follower, the latter is moved away from the shaft 5 against the action of the spring 15 and as soon as the cam member passes the follower, the latter is moved towards the shaft 5 by the spring 15. This reciprocation of the cam follower produces operation of the trigger motor and causes firing of the gun as is well understood in the art.

When the cam member 9 has moved the follower away from the shaft the recess 22 in the follower is positioned in line with the plunger but the plunger cannot enter the recess because at this time it is held in the withdrawn position by the lower arm 26 which is riding on the lower control cam 18. It is only necessary to hold the plunger withdrawn during the time that the recess 22 of the reciprocating follower is in line with the plunger. Firing of the gun will continue so long as the lower arm 26 is in position to be engaged by the lower control cam 18.

When it is desired to discontinue firing, the operator causes removal of the lower arm 26 from the path of the cam 18 and as a consequence the spring 28 automatically moves the upper arm 25 into the path of the upper control cam 17. With the shaft 5 rotating in the proper direction the cam member 9 moves the follower 10 away from the shaft and positions the recess 22 in line with the plunger 20. At this time the arm 25 is riding towards the peak of the cam 17 and is rocked on its pivot to force the plunger 20 into the recess 22 of the follower as seen in Fig. 1. In this position the follower is in the safe or inoperative position and the gun cannot continue to fire.

Because of the fact that the peak of the cam 17 follows the cam 9 when the shaft is rotating in the proper direction to insure correct timing of the entry of the plunger 20 in the recess 22 of the follower, it would be possible to damage the mechanism if the shaft 5 should be rotated in the wrong direction when the plunger is out of engagement with the follower. This is evident because under such a condition the recess 22 would not be in line with the plunger. In the event of rotation of shaft 5 in the wrong direction, the safety cam 19 engages the arm 25 and moves it away from the wheel 16, without rocking it about its pivot. In this position the arm 25 cannot move the plunger towards the follower.

I claim:

1. In a synchronizing gear for machine guns, an impulse generator including a driven shaft, a cam member on said shaft, a cam follower having a recess, means for normally holding the follower against the cam member, a reciprocally mounted plunger adapted to enter the recess of the follower to hold it away from the cam member, said plunger having a pair of spaced apertures, a plate on the driven shaft, a pair of control cams positioned marginally on opposite sides of the plate, the control cam on the side towards the follower having one end receding from the periphery of the plate to provide a safety cam, a pivoted lever alongside the plunger, a pair of arms pivoted to the lever and each extending through an aperture of the plunger, said arms adapted when moved into the path of the control cams to be rocked thereby to reciprocate the plunger into and out of locking engagement with the follower, and the arm for moving the plunger into locking engagement adapted to be rendered inoperative by the safety cam when the driven shaft is rotated in the wrong direction.

2. In a synchronizing gear for machine guns, an impulse generator including a driven shaft, a cam member on said shaft, a cam follower having a recess, means for normally holding the follower against the cam member, a reciprocally mounted plunger adapted to enter the recess of the follower to hold it away from the cam member, said plunger having a pair of spaced apertures, a plate on the driven shaft, a pair of control cams positioned marginally on opposite sides of the plate, a pivoted lever alongside the plunger, a pair of arms pivoted to the lever and each extending through an aperture of the plunger, said arms adapted when moved into the path of the control cams to be rocked thereby to reciprocate the plunger into and out of locking engagement with the follower.

3. In a synchronizing gear for machine guns, an impulse generator including a driven shaft, a cam member on said shaft, a cam follower having a recess, means for normally holding the follower against the cam member, a reciprocally mounted plunger adapted to enter the recess of the follower to hold it away from the cam member, a plate on the driven shaft, a pair of control cams positioned marginally on opposite sides of the plate, a pivoted lever alongside the plunger, a pair of arms pivoted to the lever and engageable with the plunger, said arms adapted when moved into the path of the control cams to be rocked thereby to reciprocate the plunger into and out of locking engagement with the follower.

4. In a synchronizing gear for machine guns, an impulse generator including a driven shaft, an impulse cam member on said shaft, a cam follower, a plunger for holding the follower in inoperative position, control cams on the driven shaft and means selectively movable into the path of the control cams and actuated thereby to move the plunger into and out of locking engagement with the follower.

JAMES L. HATCHER.